United States Patent
Nakanishi

(10) Patent No.: US 9,323,477 B2
(45) Date of Patent: Apr. 26, 2016

(54) OPERATING DEVICE AND IMAGE FORMATION DEVICE

(71) Applicant: KYOCERA Document Solutions Inc., Osaka (JP)

(72) Inventor: Shinichi Nakanishi, Osaka (JP)

(73) Assignee: KYOCERA DOCUMENT SOLUTIONS INC. (JP)

( * ) Notice: Subject to any disclaimer, the term of this patent is extended or adjusted under 35 U.S.C. 154(b) by 0 days.

(21) Appl. No.: 13/685,826

(22) Filed: Nov. 27, 2012

(65) Prior Publication Data

US 2013/0135653 A1    May 30, 2013

(30) Foreign Application Priority Data

Nov. 29, 2011    (JP) .................................. 2011-260022

(51) Int. Cl.
| | | |
|---|---|---|
| G06F 15/00 | (2006.01) | |
| G06F 3/12 | (2006.01) | |
| G06F 3/01 | (2006.01) | |
| H04N 1/00 | (2006.01) | |
| G06F 3/023 | (2006.01) | |

(52) U.S. Cl.
CPC *G06F 3/12* (2013.01); *G06F 3/018* (2013.01); *G06F 3/0237* (2013.01); *H04N 1/00411* (2013.01); *H04N 1/00437* (2013.01)

(58) Field of Classification Search
None
See application file for complete search history.

(56) References Cited

U.S. PATENT DOCUMENTS

| | | | | |
|---|---|---|---|---|
| 5,734,928 | A  * | 3/1998 | Nakasuji ......................... | 710/67 |
| 2006/0248469 | A1* | 11/2006 | Czerwinski et al. .......... | 715/764 |
| 2007/0201069 | A1* | 8/2007 | Tanaka et al. ................ | 358/1.13 |
| 2007/0287494 | A1 | 12/2007 | You et al. ................... | 455/550.1 |
| 2008/0052777 | A1* | 2/2008 | Kawano et al. ................. | 726/18 |
| 2009/0215500 | A1 | 8/2009 | You et al. ...................... | 455/566 |
| 2010/0177361 | A1* | 7/2010 | Amemiya .................... | 358/468 |
| 2011/0276916 | A1* | 11/2011 | Kunori .......................... | 715/773 |
| 2012/0110494 | A1* | 5/2012 | Jun .............................. | 715/773 |

FOREIGN PATENT DOCUMENTS

| | | |
|---|---|---|
| JP | 64-008476 | 1/1989 |
| JP | 2007-267388 | 10/2007 |
| JP | 2011-237983 | 11/2011 |

OTHER PUBLICATIONS

Japanese Office Action dated Jun. 25, 2013 issued in Japanese Application No. 2011-260022.

* cited by examiner

*Primary Examiner* — Helen Q Zong
(74) *Attorney, Agent, or Firm* — Ostrolenk Faber LLP

(57) ABSTRACT

An operating device of the disclosure includes: a plurality of operation keys; and a processing unit executing a process corresponding to a pushed operation key from among the operation keys, the processing unit executing a process corresponding to a specified operation key when the processing unit detects that the specified operation key and an operation key located near the specified operation key from among the operation keys are pushed at the same time.

4 Claims, 4 Drawing Sheets

OPERATING DEVICE AND IMAGE FORMATION DEVICE

BACKGROUND OF THE DISCLOSURE

1. Field of the Disclosure

The present disclosure relates to an operating device and an image formation device.

This application claims priority from Japanese Patent Application No. 2011-260022 filed on Nov. 29, 2011, the contents of which are incorporated herein by reference in their entirety.

2. Background Art

Conventionally, it is necessary to push a space key when characters which are input using a keyboard are converted into Kanji characters under Japanese input environment. At this time, an inputting error due to the space key and the key disposed around the space key being simultaneously pushed may occur. In this case, generally, the character which is mistakenly input is erased by pushing a delete key or a back space key.

For example, in a generally-known technique, in a case where, an inputting error is found in the character string displayed after keyboard-input characters are converted into Kanji characters, the character string, which is converted into Kanji characters, is returned to original kana-character string (Japanese syllabary characters, the character string before Kanji-character conversion) by pushing a back space key; simultaneously, one character, which is at the end of the kana-character string, is erased.

The more the number of occurrences of the above-described inputting error due to a plurality of keys being pushed at the same time, the less the keyboard is downsized (as such a keyboard, for example, a hard keyboard and a software keyboard are used). Consequently, in the method of erasing mistakenly-input character by simply pushing a delete key or the like, an erase operation is frequently carried out, and this method causes a user to feel vexatiousness.

Additionally, in the aforementioned technique, it is not determined whether or not incorrect input occurs at the primal Kanji-character conversion when keyboard-input characters are converted into Kanji characters; when the user perceives the incorrect input and pushes a back space key, the technique is utilized. For this reason, since an operation of pushing the back space key is necessary, an operation step is not eliminated, user's vexatiousness still cannot be solved.

SUMMARY OF THE DISCLOSURE

The disclosure was conceived in view of the above-described circumstances, and has an object to provide an operating device capable of continuing an input operation in which a key is reliably input by the user so that the user intends to push the key without performing a superfluous operation such as an erase operation of erasing a mistakenly input character (user does not feel vexatiousness) even when a plurality of keys are pushed at the same time, and provide an image formation device provided with the operating device.

In order to solve the above-described problem, an operating device of a first aspect of the disclosure includes a plurality of operation keys and a processing unit executing a process associated with a pushed operation key from among the operation keys. The processing unit executes a process associated with a specified operation key when the processing unit detects that the specified operation key and an operation key located near the specified operation key from among the operation keys are pushed at the same time.

An image formation device of a second aspect of the disclosure includes the operating device of the above-described first aspect.

EFFECTS OF THE DISCLOSURE

According to the disclosure, even where simultaneous pushing occurs where the specified operation key and an operation key located near the specified operation key from among the operation keys are pushed, since the process associated with the specified operation key is executed, a superfluous operation of erasing a mistakenly input character which is caused by incorrectly input due to pushing an operation key located near the specified operation key is not carried out. Particularly, a user does not feel vexatiousness, it is possible to continue input operations in which a key is reliably input by the user so that the user intends to push the key.

For example, the case where a plurality of operation keys are a character-input key, a character-conversion key, and an enter key is described. If simultaneous pushing occurs where the character-conversion key and a character-input key located near the character-conversion key are pushed at the same time, a process associated with the character-conversion key (character conversion process) is executed. Additionally, if simultaneous pushing occurs where the enter key and a character-input key located near the enter key are pushed at the same time, a process associated with the enter key (character decision process) is executed. Accordingly, since the character corresponding to the character-input key which is pushed simultaneously with the pushing of character-conversion key or the enter key is not mistakenly input (is not displayed on display unit), it is possible to continue input operations in which a key is reliably input by the user so that the user intends to push the key without performing a superfluous operation of erasing a mistakenly input character.

DESCRIPTION OF THE PREFERRED EMBODIMENTS

Hereinafter, an embodiment of the disclosure will be described with reference to drawings. In the description below, as an image formation device provided with an operating device related to the disclosure, a multifunction device functioning as a copying machine, a printer, a facsimile, or the like will be illustrated using an example.

Figure 1:
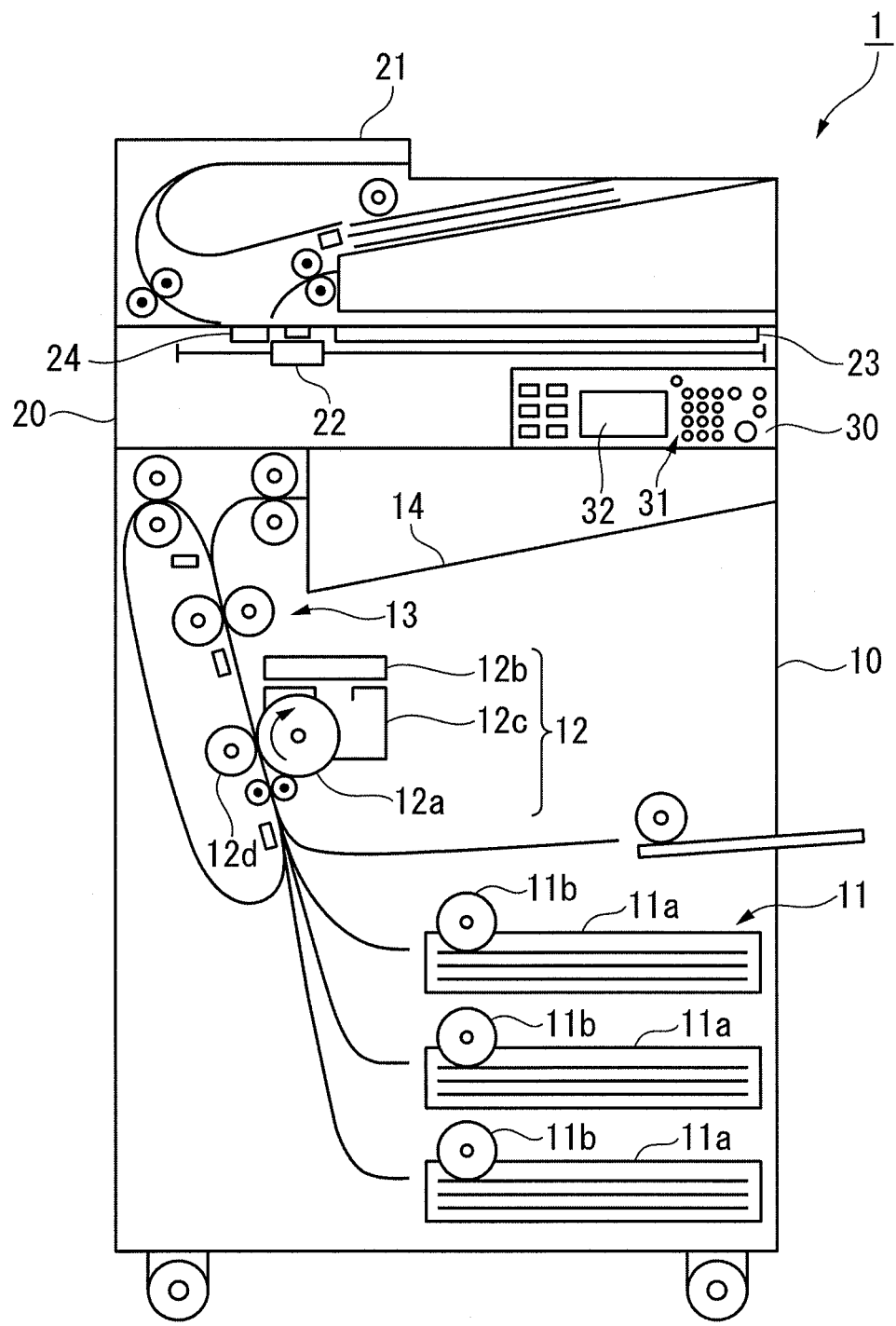
FIG. 1 is a front perspective view showing a relevant part of a multifunction device 1 related to an embodiment of the disclosure.

FIG. 1 is a front perspective view showing a relevant part of a multifunction device 1 related to the embodiment of the disclosure.

Figure 2:
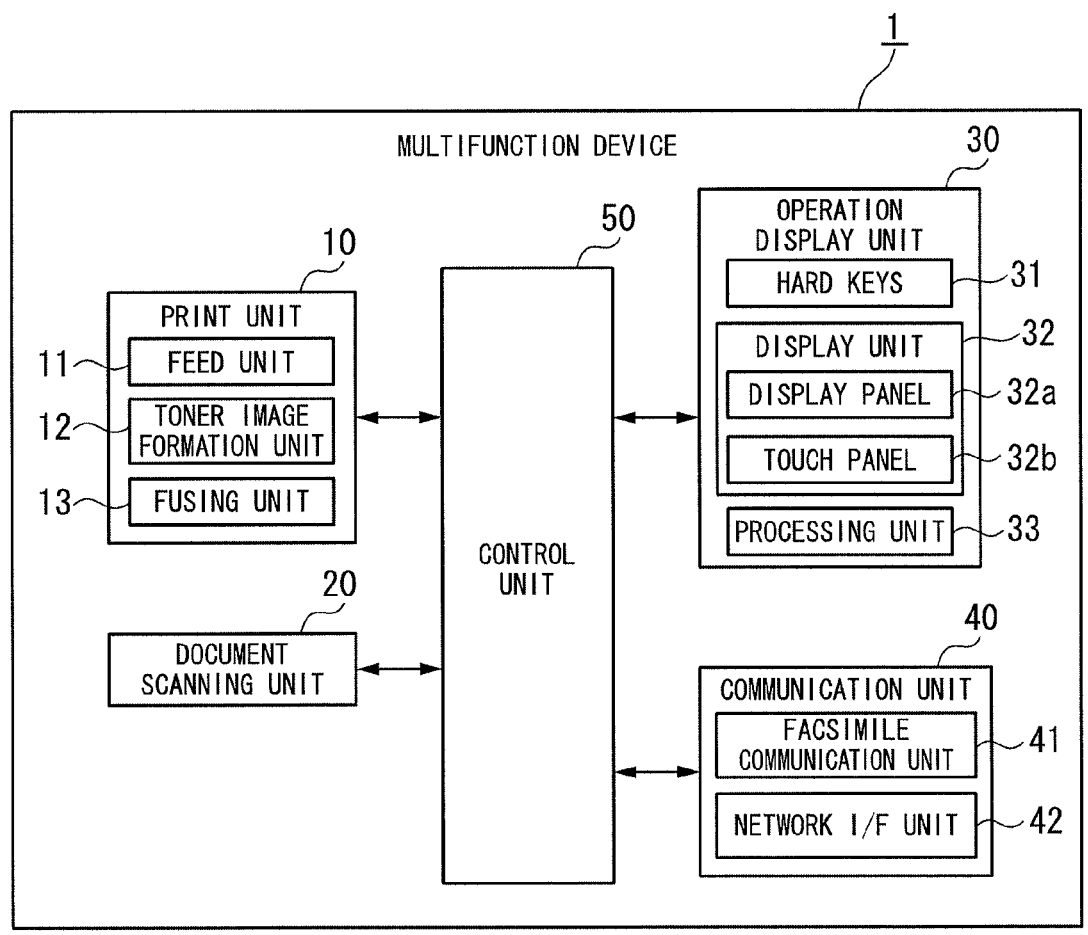
FIG. 2 is a functional block diagram illustrating the multifunction device 1 related to the embodiment of the disclosure.

FIG. 2 is a functional block diagram illustrating multifunction device 1. As shown in FIGS. 1 and 2, the multifunction device 1 is provided with a print unit 10, a document scanning unit 20, an operation display unit 30 (corresponding to operating device related to the disclosure), a communication unit 40, and a control unit 50.

The print unit 10 prints an image on papers for printing and outputs the printed paper under control by the control unit 50. The print unit 10 is provided with a feed unit 11, a toner image formation unit 12, a fusing unit 13, a discharge tray 14, and the like. The feed unit 11 is capable of containing a plurality of standard papers for printing (for example, several ten papers) and provided with a plurality of feed cassettes 11 a which can be pulled out from a front side of the multifunction device 1. The paper, which is on the uppermost level from among a plurality of papers for printing stored and stacked in each feed cassette 11a, is fed by drive of driving pickup rollers 11b and transferred to the toner image formation unit 12.

The toner image formation unit 12 forms a toner image corresponding to an image to be printed on the paper. The toner image formation unit 12 is provided with a photosensitive drum 12a, an exposure unit 11b, a development unit 12c, a transfer unit 12d and the like. The photosensitive drum 12a forms an electrostatic latent image corresponding to an image to be printed, and the photosensitive drum 12a is a circular-cylindrical photoreceptor sensitizing the developed toner image. The exposure unit 12b irradiates the photosensitive drum 12a with a laser light forming an electrostatic latent image on a surface of the photosensitive drum 12a.

Toner is supplied to the photosensitive drum 12a on which the electrostatic latent image is formed, and the development unit 12c develops the electrostatic latent image and forms a toner image. The transfer unit 12d transfers the toner image, which is sensitized by photosensitive drum 12a, onto the paper which is transferred from the feed unit 11.

The fusing unit 13 fuses the toner image, which is transferred to (formed on) the paper for printing by the toner image formation unit 12, on the paper for printing by heating and applying pressure thereon. Thereafter, as a printed paper on which a desired image is printed, the fusing unit 13 discharges (outputs) the paper which is subjected to the fusing process to the discharge tray 14.

The discharge tray 14 is the portion in which the printed paper output from the fusing unit 13 is accumulated and stored, and is provided at an upper portion of the print unit 10.

The document scanning unit 20 scans documents set by a user under control by the control unit 50, generates document image data indicating the image (document image) of the documents, and outputs the data to the control unit 50. The document scanning unit 20 is provided with an ADF 21 (automatic document feeder), a carriage 22, a document table 23, a document scanning slit 24, and the like. The ADF 21 is a device sequentially and automatically feeding the documents to be scanned. The carriage 22 is provided with an exposure lamp, a CCD (Charge Coupled Device) sensor, and the like, and scans the documents which are sequentially fed by the ADF 21 or the document set on the document table 23.

Specifically, in the case where the document set on the document table 23 is scanned, the carriage 22 scans the document with a CCD sensor while moving in a longitudinal direction of the document table 23. In contrast, in the case where the document fed from the ADF 21 is scanned, the carriage 22 is located at the position facing the document scanning slit 24 (below the document scanning slit 24), and the carriage 22 scans the documents sequentially fed from the ADF 21 with the CCD sensor through the document scanning slit 24.

The operation display unit 30 is a GUI(Graphical User Interface), which outputs a signal corresponding to an operation by a user (operation signal) to the control unit 50 and displays a variety of information or the like informed from the control unit 50 and indicating a status of the multifunction device 1. The operation display unit 30 is provided with hard keys 31, a display unit 32, and a processing unit 33.

The hard keys 31 are operation keys constituted of, for example, a copy start key, a copy-stop/clear key, a numeric key (numerical value input key), the function switching key, or the like. In particular, when a user uses each of a copy function, a print function, a scan function, and a facsimile function, which can be carried out using the multifunction device 1, the function switching key is used for switching an operation mode of the function in the multifunction device 1.

Figure 3A:
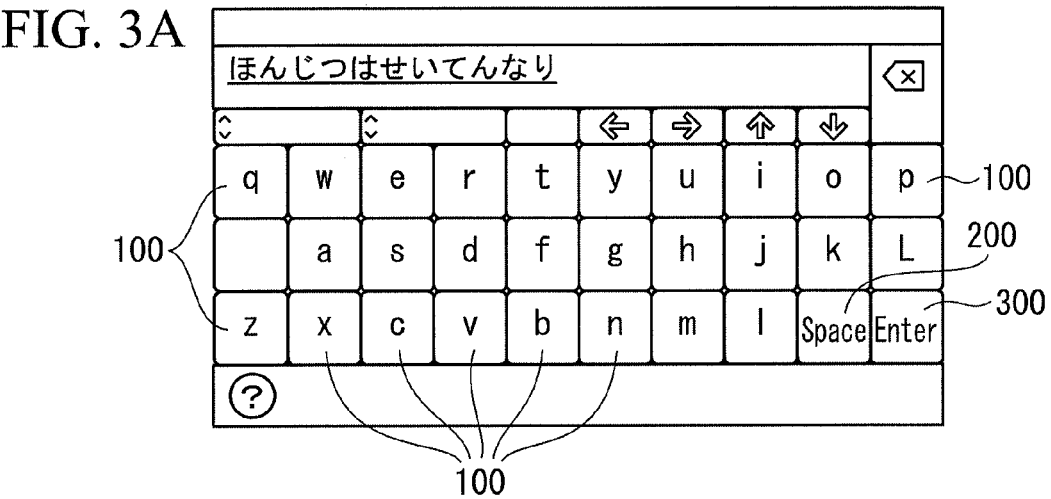
FIG. 3A is a first explanatory diagram illustrating a character input operation using an operation display unit 30 (operating device) related to the embodiment of the disclosure.

The display unit 32 is provided with a display panel 32a displaying a predetermined image under control by the processing unit 33 and a touch panel 32b disposed so as to face the display panel 32a. The display panel 32a is, for example, a liquid crystal panel, an organic EL panel, or the like. Additionally, the touch panel 32b outputs, to the processing unit 33, a signal indicating coordinates of the portion of the touch panel 32b being pressed. Moreover, as shown in FIG. 3A, a plurality of operation keys including character-input keys 100, a space key 200 (character-conversion key), an enter key 300 (decision key), or the like are displayed as software keys on the display panel 32a.

The processing unit 33 is a microprocessor into which, for example, a CPU (Central Processing Unit), a memory, an input-output interface, or the like are integrally assembled. The processing unit 33 displays, on the display panel 32a, a variety of information or the like informed from the control unit 50 and indicating a status of the multifunction device 1. The processing unit 33 determines which operation key is being pushed from among the keys displayed on the display panel 32a based on a process associated with the pushed hard key 31 or an output signal of the touch panel 32b (signal indicating the coordinates of the portion being pressed), and executes a process associated with the determined operation key.

When the processing unit 33 detects that, for example, the copy start key is pushed from among the hard keys 31, the processing unit 33 outputs, to the control unit 50, the operation signal indicating the copy start key was pushed. Furthermore, for example, the processing unit 33 carries out the processes of displaying, on the display panel 32a, the character corresponding to the pushed character-input key 100 from among the operation keys which are being displayed on the display panel 32a, performing conversion of characters which are being displayed when the space key 200 is pushed (for example, Kanji-character conversion or the like), and determines the characters which are being currently displayed when the enter key 300 is pushed.

As described below in detail, the processing unit 33 possesses a function of disabling the pushing of the character-input key 100 (i.e., character input) and only executing the process associated with the space key 200 or the enter key 300 as the characteristic function in the embodiment of the disclosure when the processing unit 33 detects simultaneous pushing where the space key 200 or the enter key 300 and the character-input key 100 located near these keys are pushed at the same time.

In particular, in the embodiment of the disclosure, the concept of "simultaneous pushing" includes not only the meaning in that pushing timings of a plurality of keys strictly coincide with each other but also the meaning in that a plurality of keys are sequentially pushed at different timings in a given time (for example, within several dozens of milli-seconds).

The communication unit 40 carries out communication with external devices such as a facsimile or a personal computer of a person or party to whom a user wishes to connect, or the like. The communication unit 40 is provided with a facsimile communication unit 41 and a network I/F unit 42. The facsimile communication unit 41 is connected to a public telephone line and carries out communication with the facsimile of a person or party to whom a user wishes to connect. The network I/F unit 42 is connected to, for example, a LAN (Local Area Network). The network I/F unit 42 carries out communication with a terminal device such as a personal computer which is similarly connected to the LAN.

The control unit 50 integrally controls the total operation of the multifunction device 1 based on an operation signal which the operation display unit 30 inputs to the control unit 50 and a signal which is received by an external device through the communication unit 40. When, for example, the operation signal indicating the pushing of the copy start key is input from the operation display unit 30 in a copy mode, the control unit 50 instructs the document scanning unit 20 to scan a document and controls the print unit 10 based on document image data generated at the document scanning unit 20 so as to print the scanned document image on a paper for printing having a predetermined size.

Next, an operation of the multifunction device 1 configured as described above will be described. Particularly, an explanation of operation of a commonly-used multifunction device in a copy mode, a printing mode, or the like is omitted in the following description, and the characteristic operation of the embodiment of the disclosure, that is, a character input operation by action of the operation display unit 30 will be described while attention is focused thereon.

As shown in FIG. 3A, a plurality of operation keys including the character-input key 100, the space key 200, the enter key 300, or the like are firstly displayed on the display panel 32*a* of the operation display unit 30. It is envisaged that the character string of Japanese syllabary characters "ほんじつは せいてんなり" is input by pushing various character-input keys 100 (accurately, by pushing the touch panel 32*b*). When the operation display unit 30 is in, for example, a Roman-character input mode, the character string of "ほんじつは せいてんなり" is input by inputting "honjituhaseitennnari" and by pushing the character-input key 100.

Then, if the space key 200 is pushed, uneventfully, the character string of Japanese syllabary characters "ほんじつは せいてんなり" is converted into the character string " 本日は晴天なり" in which Japanese syllabary characters and Kanji characters are mixed.

Figure 3B:
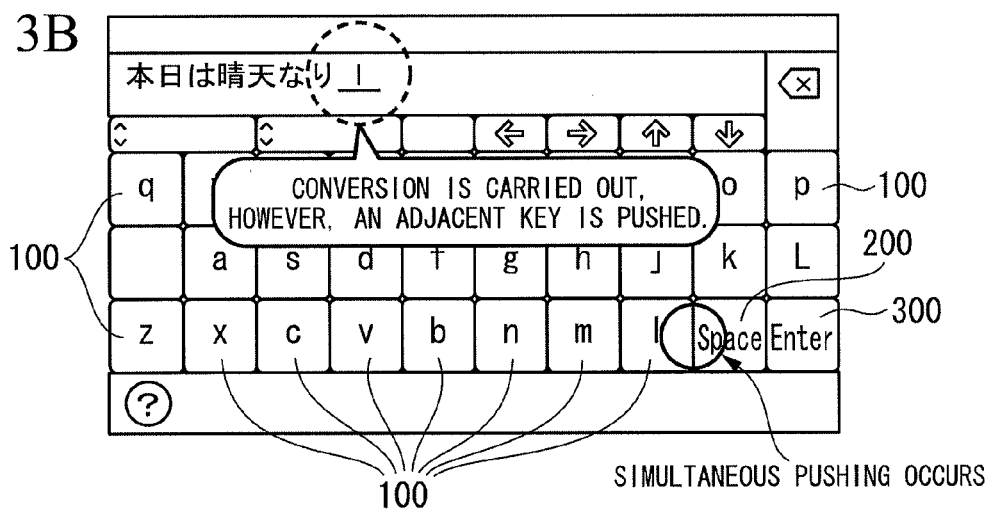
FIG. 3B is the first explanatory diagram illustrating the character input operation using an operation display unit 30 (operating device) related to the embodiment of the disclosure.
Figure 3C:
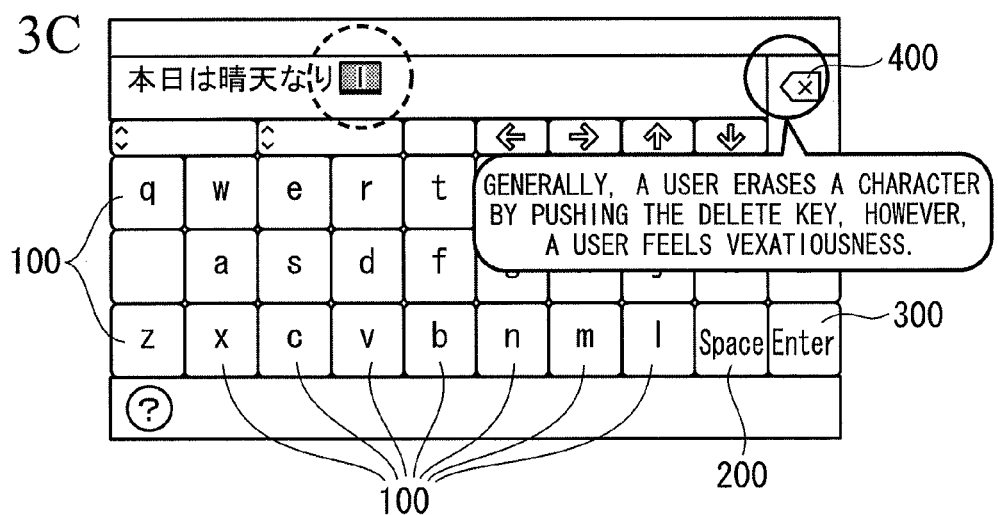
FIG. 3C is the first explanatory diagram illustrating the character input operation using an operation display unit 30 (operating device) related to the embodiment of the disclosure.

However, when, for example, the character-input keys 100 corresponding to the space key 200 and the lower-case character "l" adjacent thereto are simultaneously pressed, as shown in FIG. 3B, the character string "ほんじつは ほんじつは" is converted into the character string " 本日は晴天なり" and the character "l" is simultaneously input so as to be located at the end of the character string. As previously described, conventionally, when an inputting error occurs which is due to the space key 200 and the character-input key 100 disposed around the space key 200 being simultaneously pushed as described above, generally, a user erases a mistakenly input character "l" by pushing a delete key 400 as shown in FIG. 3C.

In contrast, in the embodiment of the disclosure, the processing unit 33 of the operation display unit 30 has a function of disabling the pushing of the character-input key 100 (i.e., character input) and only executing the process associated with the space key 200 or the enter key 300 when the processing unit 33 detects that simultaneous pushing where the space key 200 or the enter key 300 and the character-input key 100 located near these keys are simultaneously pushed.

In other words, when the processing unit 33 detects simultaneous pushing where the space key 200 and the character-input key 100 located near the space key 200 are simultaneously pushed, the processing unit 33 disables the pushing of the character-input key 100 (i.e., character input) and only executes the process associated with the space key 200. Additionally, the processing unit 33 has a function of disabling the pushing of the character-input key 100 (i.e., character input) and only executing the process associated with the enter key 300 when the processing unit 33 detects simultaneous pushing where the enter key 300 and the character-input key 100 located near the enter key 300 are simultaneously pushed.

Figure 4A:
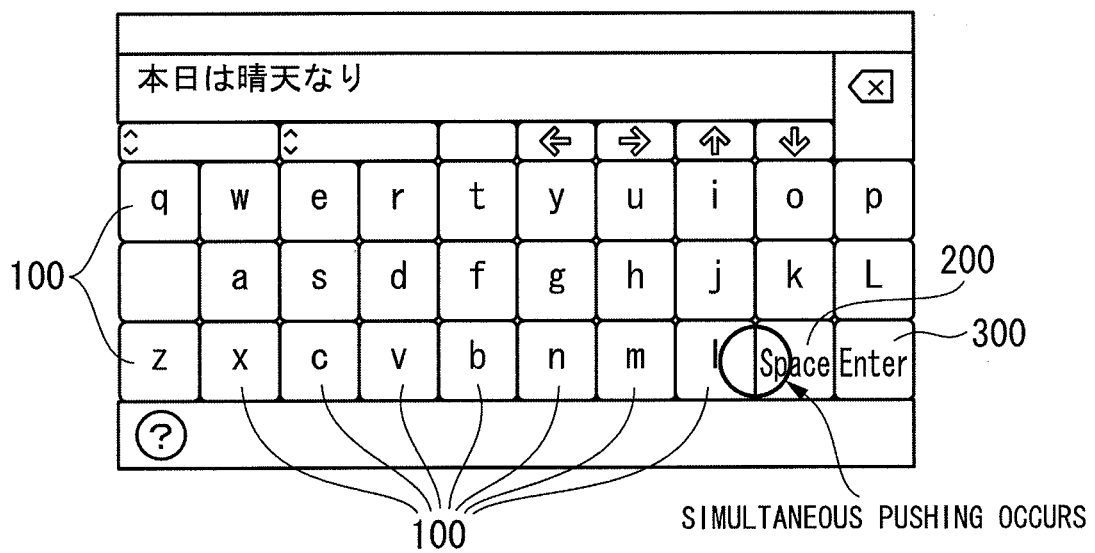
FIG. 4A is a second explanatory diagram illustrating a character input operation using an operation display unit 30 (operating device) related to the embodiment of the disclosure.

Particularly, when the processing unit 33 detects the simultaneous pushing where, for example, the space key 200 and the character-input key 100 corresponding to the lower-case character "l" which is located next to the space key 200 are pushed at the same time based on the output signal of the touch panel 32*b*, the processing unit 33 disables the character input of the lower-case character "l" and only executes the process associated with the space key 200 (i.e., character conversion process). Consequently, as shown in FIG. 4A, only a conversion process of the character string "ほんじつは せいて んなり" is carried out, that is, only the process associated with the input operation is executed in which a key is reliably input by the user so that the user intends to push the key.

Furthermore, after the processing unit 33 converts the character string "ほんじ つはせい てんなり" into the character string "本日は晴天なり" as described above, when the processing unit 33 detects the simultaneous pushing where, for example, the enter key 300 and the character-input key 100 corresponding to the upper-case character "L" which is located next to the enter key 300 are pushed at the same time based on the output signal of the touch panel 32*b*, the processing unit 33 disables the character input of the upper-case character "L" and only executes the process associated with the enter key 300 (i.e., character decision process). Consequently, a decision process of the character string " 本日は晴天なり" is only carried out, that is, only the process associated with the input operation is executed in which a key is reliably input by the user so that the user intends to push the key.

In the above-description, according to the embodiment of the disclosure, when the simultaneous pushing occurs where the space key 200 and the character-input key 100 located near the space key 200 are pushed at the same time, only the process associated with the space key 200 is executed. Moreover, when the simultaneous pushing occurs where the enter key 300 and the character-input key 100 located near the enter key 300 are pushed at the same time, only the process associated with the enter key 300 is executed. As a result, since the character associated with the character-input key 100, which is pushed simultaneously with pushing the space key 200 or the enter key 300, is not mistakenly input, it is possible to continue input operations in which a key is reliably input by the user so that the user intends to push the key without performing a superfluous operation of erasing incorrect input (without causing a user to feel vexatiousness).

As described above, an embodiment of the disclosure is described. The disclosure is not limited to the above embodiments, but various modifications may be made without departing from the scope of the disclosure.

Figure 4B:
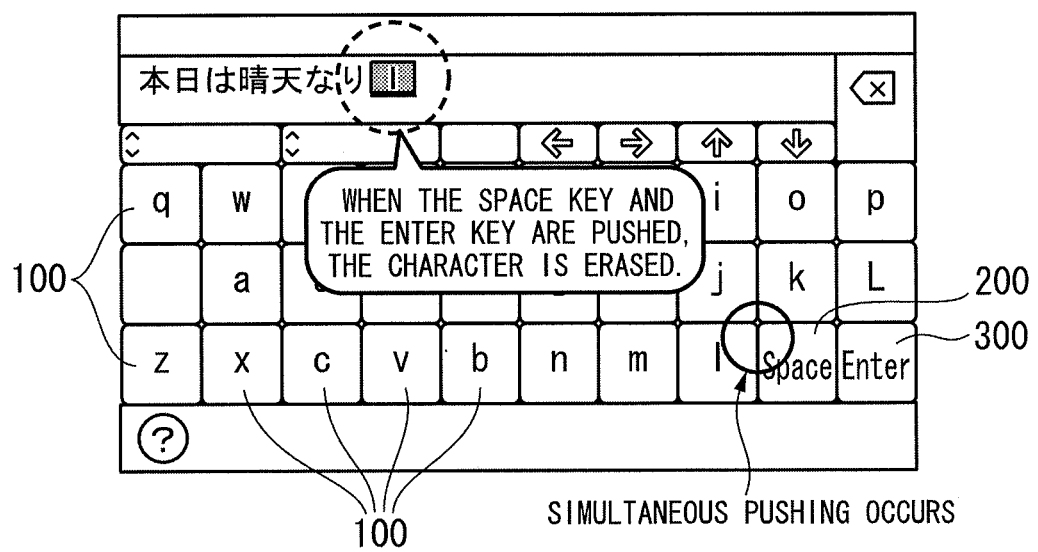
FIG. 4B is the second explanatory diagram illustrating the character input operation using an operation display unit 30 (operating device) related to the embodiment of the disclosure.

For example, as shown in FIG. 4B, the processing unit 33 may have a function of displaying, on the display panel 32*a*, the character corresponding to the character-input key 100 which is pushed simultaneously with pushing the space key 200 or the enter key 300 in addition to carrying out the process associated with the space key 200 or the enter key 300, thereafter, automatically erasing the character from the display when the simultaneous pushing is detected where the space key 200 or the enter key 300 and the character-input key 100 located near these keys are simultaneously pushed.

Furthermore, the aforementioned embodiment is illustrated with reference to a multifunction device 1 as an image formation device related to the disclosure. The operating device (operation display unit 30) related to the disclosure is widely applicable to an operating device of another image formation device such as a copying machine, a printer, or the like.

Moreover, in the aforementioned embodiment, the operation display unit 30 specialized for character input (i.e., character input by software keys) using the touch panel 32*b* is illustrated as an operating device which is applied to an image formation device. In other cases, the operating device related to the disclosure may be applicable to a device which is provided with hardware keys as operation keys and which carries out character input by operating the hardware keys.

Additionally, the operating device related to the disclosure is not limited for a character input operation and may be widely applicable to a device which is provided with a plurality of operation keys and which has a possibility that simultaneous pushing occurs where the specified operation key and the operation key located near the specified operation key are pushed at the same time. In the case of explaining, for example, the operation display unit 30 built-in the multifunction device 1, it is conceivable that the processing unit 33 has a function of executing the process associated with a copy start key (i.e., process performing copy) when the copy start key serving as the specified operation key and the operation key located near this key are pressed at the same time.

What is claimed is:

1. An operating device comprising:
a plurality of operation keys including character-input keys, a character-conversion key, and an enter key;
a processing unit executing a process associated with a pushed operation key from among the operation keys; and
a display unit displaying a predetermined image, wherein
the processing unit executes processes which allow the display unit to display Japanese syllabary characters associated with the character-input keys which are pushed in a Roman-character input mode, perform conversion of the Japanese syllabary characters into a character string in which Japanese syllabary characters and Kanji characters are mixed when the character-conversion key is pushed, and determine the currently-displayed characters when the enter key is pushed, when the processing unit detects that the character-conversion key and the character-input key, which is located next to the character-conversion key, are pushed at the same time, the processing unit disables the pushing of the character-input key so that the character input of the character-input key is disabled and only executes the process to convert the Japanese syllabary characters, which are input before the character-conversion key and the character-input key are pushed at the same time, into a character string in which the Japanese syllabary characters and the Kanji characters are mixed, the process being associated with the character-conversion key, both disabling the character input of the character-input key and executing the process associated with the character-conversion key are performed based on pushing alone of the character-conversion key and the character-input key, which is located next to the character-conversion key, at the same time, and when the processing unit detects that the character-conversion key and the character-input key located next to the character-conversion key are pushed at the same time, the character of the character-input key which is pushed simultaneously with the pushing of the character-conversion key is displayed once on the display unit in addition to the process to convert the Japanese syllabary characters into the character string in which the Japanese syllabary characters and the Kanji characters are mixed, the process being associated with the character-conversion key, and then, the character is removed from the display.

2. The operating device according to claim 1, wherein
the display unit comprises a display panel displaying the image and a touch panel disposed so as to face the display panel,
the operation keys are software keys displayed on the display panel, and
the processing unit determines which operation key being displayed on the display panel is pushed, based on a signal output from the touch panel, the signal indicating coordinates of a pushed position on the touch panel.

3. An image formation device comprising:
the operating device according to claim 1.

4. An operating device comprising:
a plurality of operation keys including character-input keys, a character-conversion key, and an enter key;
a processing unit executing a process associated with a pushed operation key from among the operation keys; and
a display unit displaying a predetermined image, wherein
the processing unit executes processes which allow the display unit to display a first type of characters associated with the character-input keys which are pushed in an input mode of a second type of characters, perform conversion of the first type of characters into a character string in which the first type of characters and a third type of characters are mixed when the character-conversion key is pushed, and determine the currently-displayed characters when the enter key is pushed, when the processing unit detects that the character-conversion key and the character-input key, which is located next to the character-conversion key, are pushed at the same time, the processing unit disables the pushing of the character-input key so that the character input of the character-input key is disabled and only executes the process to convert the first type of characters, which are input before the character-conversion key and the character-input key are pushed at the same time, into a character string in which the first type of characters and the third type of characters are mixed, the process being associated with the character-conversion key, both disabling the character input of the character-input key and executing the process associated with the character-conversion key are performed based on pushing alone of the character-conversion key and the character-input key, which is located next to the character-conversion key, at the same time, and when the processing unit detects that the character-conversion key and the character-input key located next to the character-conversion key are pushed at the same time, the character of the character-input key which is pushed simultaneously with the pushing of the character-conversion key is displayed once on the display unit in addition to the process to convert the first type of characters into the character string in which the first type of characters and the third type of characters are mixed, the process being associated with the character-conversion key, and then, the character is removed from the display, the first, second, and third types of characters being different from one another.

\* \* \* \* \*